United States Patent [19]

Falk et al.

[11] 3,787,616

[45] Jan. 22, 1974

[54] TIME BASE ERROR CORRECTION SYSTEM AND METHOD

[75] Inventors: Mervin L. Falk, Sunnyvale; Louis Olah, San Jose, both of Calif.

[73] Assignee: Newell Industries Inc., Sunnyvale, Calif.

[22] Filed: June 5, 1972

[21] Appl. No.: 259,980

[52] U.S. Cl. .......... 178/6.6 A
[51] Int. Cl. .......... H04n 5/76
[58] Field of Search .......... 179/100.2 S, 100.2 T; 178/6.6 P, 6.6 A; 340/174.1 B

[56] References Cited

UNITED STATES PATENTS

| | | | |
|---|---|---|---|
| 2,656,419 | 10/1953 | Dingley, Jr. | 179/100.2 S |
| 2,854,526 | 9/1958 | Morgan | 340/174.1 B |

*Primary Examiner*—Raulfe B. Zache
*Attorney, Agent, or Firm*—Flehr, Hohbach, Test, Albritton & Herbert

[57] ABSTRACT

A time base error correction system particularly useful in a magnetic recording or playback system for transducing signals relative to a magnetic record medium prepared with discrete signals thereon, or being applied thereto, at substantially regular, predetermined intervals along with information signals all to be transduced as the medium moves in a predetermined direction. A magnetic transducer cooperates with the medium to sense these signals to provide a first train of electric signals. Means are provided for generating a second train of signals at a desired repetition rate. A comparing means is coupled to receive both the first and second trains of signals and arranged to provide an output control signal representative of the phase difference between the two trains. Finally, means supporting the transducer means and responsive to the control signal adjusts the phase of the first train of signals by advancing or retarding the position of the transducer means along the direction of movement of the medium.

7 Claims, 4 Drawing Figures

PATENTED JAN 22 1974 3,787,616

TIME BASE ERROR CORRECTION SYSTEM AND METHOD

BACKGROUND OF THE INVENTION

This invention pertains to a method and means for correcting time base error experienced in record signals applied to and retrieved from a moving record medium and is particularly useful in correcting time base error in pre-recorded video signals when the pre-recorded signals are played back for reproduction.

In the transducing of pre-recorded signals as recovered, for example, from a moving record medium, such as a magnetic record medium, the timing and phase of the signals as taken off of the record medium must correspond very closely to a reference timing or phase of the related system employing the record medium. Differences which may occur provide a "time base error" which has typically provided problems in maintaining the quality of the reproduced signals, particularly in the field of magnetic video recording.

SUMMARY OF THE INVENTION AND OBJECTS

As disclosed herein, for a magnetic recording or playback system of a type involving the transducing of signals relative to a magnetic record medium having discrete signals thereon occurring at substantially regular predetermined intervals and information signals all to be transduced, magnetic transducer means disposed to cooperate with the medium senses the signals to provide a first train of electric signals as well as to provide representations of the magnetically recorded information signals in transduced form. Means are also provided for generating a second train of signals at a desired repetition rate whereby comparing means, coupled to receive both the first and second trains of signals, provide an output control signal related to the difference between the repetition rates of the two trains of signals. Finally, means supporting the transducer means and responsive to the control signals serves to adjust the speed of the medium relative to the transducer means by advancing or retarding the position of the transducer means along the direction of movement of the medium and in this manner serves to adjust the repetition rate of the discrete signals so as to occur at substantially regular predetermined intervals. According to a preferred embodiment, the regularly occurring signals are all contained in the same record track as video information signals disposed along the medium. In this instance, the regularly occurring signals constitute a synchronizing pulse recorded with the video signals, such as a horizontal synchronizing pulse. As shown in the preferred embodiment herein, the means for supporting the record or playback head includes an elongate bi-morph leaf support member characterized by ability to bend in one direction in response to a positive polarity signal applied across its laminations and in a reverse direction to a negative polarity signal so applied.

Finally, it will be noted herein that the system includes means for adjusting the repetition rate of the second train of signals in response to prolonged changes in the repetition rate of the first train of signals.

In general, it is an object of the present invention to provide an improved time base error correction system and method wherein the time base is quickly corrected by advancing or retarding the transducer along the direction of movement of the recording medium so as to decrease or increase the relative speed of the medium to the transducer and thereby vary the timing of the signals taken from the record medium or recorded thereon.

The foregoing and other objects of the invention will become more readily evident from the following detailed description of preferred embodiments.

DETAILED DESCRIPTION OF PREFERRED EMBODIMENTS

Figure 1:
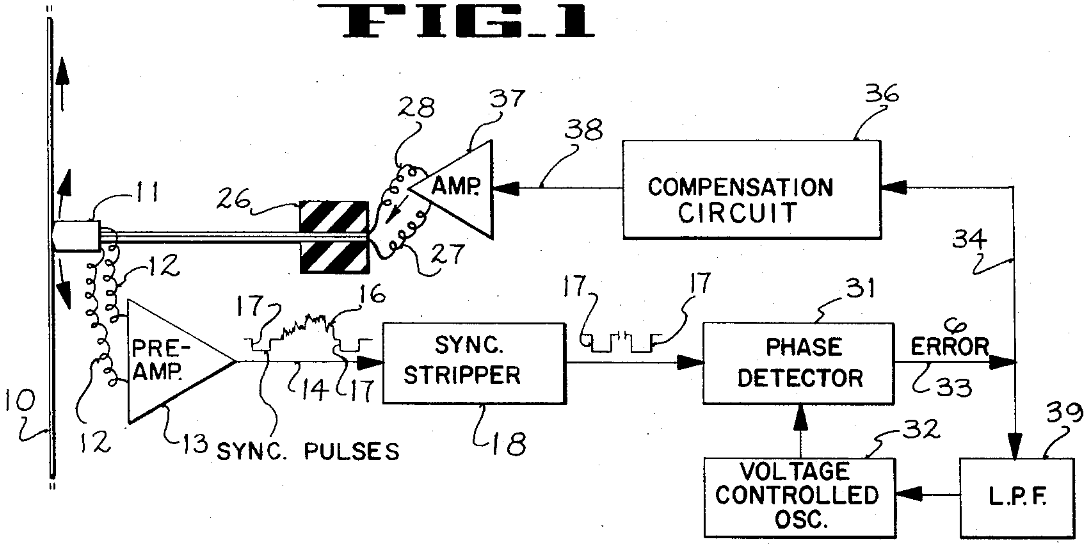
FIG. 1 is a schematic diagram showing the system according to the invention.

The recorded signals carried by the record tape 10 and herein disclosed for production of a video program consisting of the usual video signal including horizontal synchronizing pulses which occur at substantially regular predetermined intervals as is known, and also information signals containing the video portion of the program.

Means such as the record and playback head 11 is disposed to cooperate with magnetic record tape 10 so as to sense a video signal 16 recorded thereon from which there is provided via preamplifier 13 and leads 12 a first train of electric signals. This train of signals 17 is a part of the video signal herein.

As is known, a typical video signal includes horizontal synchronizing pulses 17 and others which occur at a substantially regular predetermined rate depending upon how accurately they have been recorded. For the purposes herein, it will be understood that these signals are not always perfectly recorded at exactly the same spaced intervals from one to the next nor even if perfectly spaced the playback machine can introduce momentary variations in their repetition rate. Thus, one of the purposes of this invention is to make adjustments for this deviation in the recording of the video signals on record medium 10.

The video signal 16 is fed to a stripping circuit 18 of known style which simply serves to remove all of the signal 16 with the exception of the spaced horizontal "sync" pulses 17.

As shown best in FIG. 2, transducer head 11 is disposed on the end of an elongate leaf assembly 19 referred to hereinafter as a bi-morph leaf assembly characterized by its ability to bend in one direction in response to a positive polarity signal applied to the ends thereof and in a reverse direction to a negative polarity signal.

As is known, such a bi-morph leaf comprises a pair of elongate thin strips 21, 22 of piezoceramic material, polarized when manufactured, and coated on its inner and outer surfaces by thin layers 23 of silver. Subsequently, the two strips are secured together by a conductive cement, such as epoxy material impregnated with powdered silver to form the layer 24.

One end of assembly 19 is mounted in a rubber mounting block 26 so as to provide limited damping to the movements of head 11. Leads 27, 28 are coupled to the end of assembly 19 in a manner so as to provide a positive polarity signal between the sides of (across) assembly 19 which, as is known, will cause the leaf assembly 19 to bend in one direction while a reverse polarity signal applied across leads 27, 28 will reverse the direction of bending as indicated by arrow 29.

Referring to the system shown in FIG. 1, the train of horizontal "sync" pulses 17 emerging from stripper circuit 18 is fed to a phase detecting circuit 31 of known style wherein the rate of signals 17 can be compared directly with the rate of a train of clock pulses generated at a desired repetition rate by means of a voltage controlled oscillator 32 which feeds its output to phase detector circuit 31.

Accordingly, the function of phase detector circuit 31 is simply to compare the phase or timing of pulses generated by oscillator 32 to the phase or timing of the timing signals (i.e., horizontal sync pulses 17) emerging from stripper circuit 18. In the event that there is a difference in the phase of these two trains of pulses, an error signal is produced on line 33 which is fed via line 34 to a frequency and phase compensation network 36 where the error signal gain is maximized for feeding to an amplifier 37 via line 38.

The output of amplifier 37 coupled via leads 27, 28 serves to provide the positive and negative polarity control signals across bi-morph leaf assembly 19. As this occurs, leaf assembly 19 will advance or retard in the direction of the moving record medium 10 thereby head 11, by advancing in the direction of movement, will serve to reduce the pulse repetition rate of horizontal sync pulses 17, and when it is retarded, i.e., moved in the opposite direction of the direction of movement of the record medium, will serve to increase the pulse repetition rate momentarily.

It is readily evident that sustained changes in the pulse repetition rate for timing signals 17 should not serve to advance transducer head 11 beyond the limits of its travel. Accordingly, means have been provided for re-establishing the desired repetition rate for the train of pulses fed from oscillator 32 in response to prolonged changes in the repetition rate of the timing pulses 17.

Thus, a low pass filter 39, coupled via line 34, serves to sample the error signal on line 33 from phase detector 31 whereby only those prolonged changes in the phase detector output 33 will be fed back to voltage controlled oscillator 32 in a manner so as to adjust the output rate of pulses from oscillator 32.

From the foregoing, it will be clear that in the transducing of record signals relative to a moving record medium, the method of adjusting the rate of transducing the signals relative to the medium so as to correspond substantially to a predetermined signal repetition rate is carried out by following the steps of transducing a first train of substantially regularly occurring record signals relative to the moving record medium, generating a second train of electric signals at the desired repetition rate, comparing the relative phase between the first and second trains of signals and forming a control signal proportionate to momentary phase differences between the two trains of signals and ultimately mechanically advancing or retarding the transducer head in the direction of movement of the medium under control of and in response to the control signals so formed As noted above, and in addition, the further step is also preferably pursued of adjusting the repetition rate of the second train of signals in response to prolonged changes in the repetition rate of the first train of signals.

Figures 2, 3, 4:
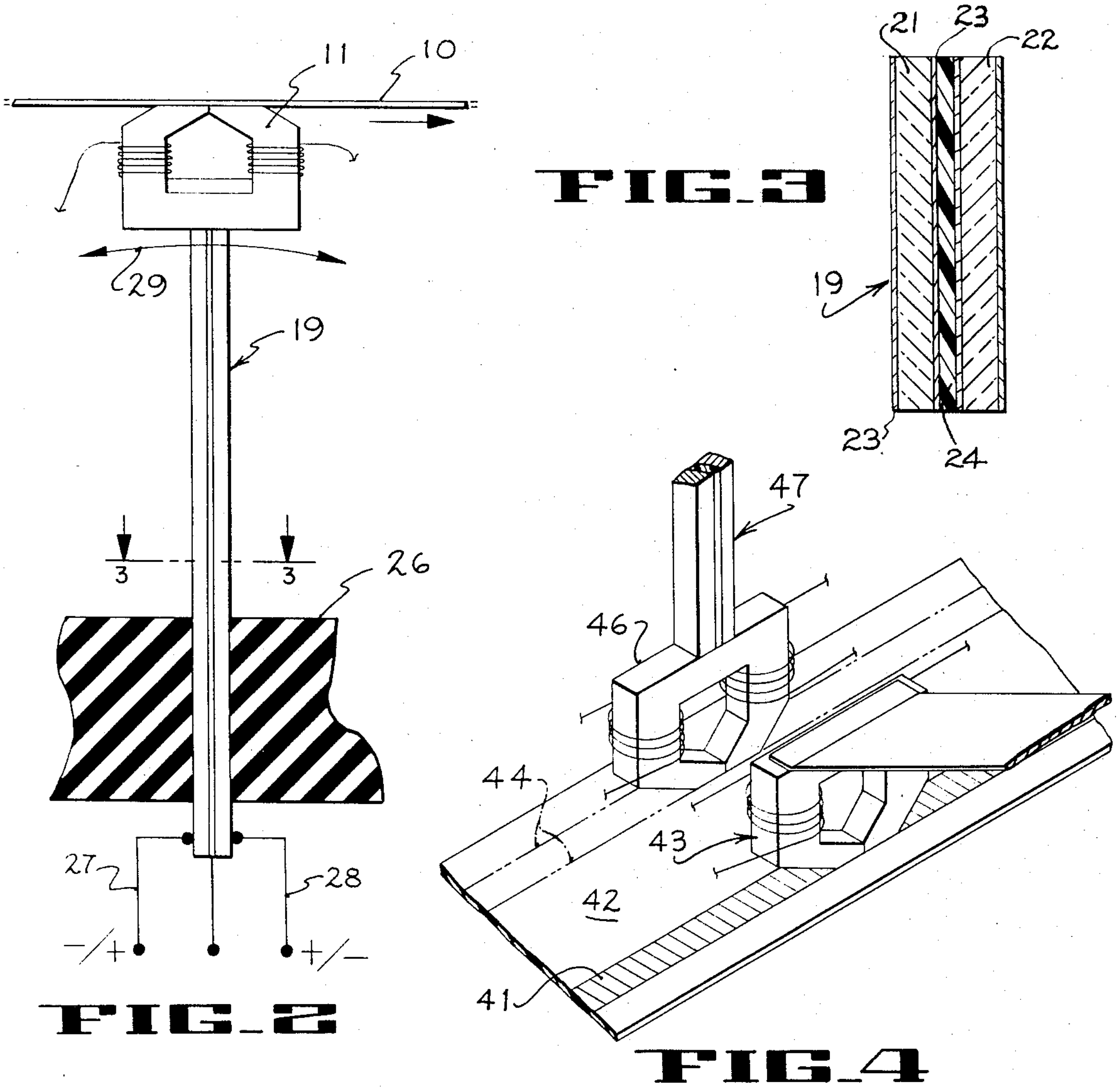
FIG. 2 is an enlarged diagrammatic view of the record/playback head and its support.
FIG. 3 is an enlarged transverse section view taken along the line 3—3 of FIG. 2.
FIG. 4 shows a schematic perspective view of another embodiment according to the invention.

According to another embodiment of the invention as shown in FIG. 4, a clock track having pre-recorded pulses occurring at regular predetermined intervals along the magnetic record medium, such as the tape 42, is monitored by its own transducer head 43 to provide the timing pulses for feeding to a phase detector 31 of a type as shown in the embodiment of FIG. 1.

A track 44 of information signals is disposed to be transduced by transducer head element 46 carried laterally adjacent transducer head element 43 and supported on the end of a bi-morph leaf assembly 47 of a type corresponding to that shown as bi-morph leaf assembly 19 above described, whereby the reproduced signals from information track 44 are reproduced independently of the timing pulses derived from clock track 41.

From the foregoing, it will be readily evident that errors occurring in the time base of signals transduced relative to a moving magnetic recording medium can be compensated for or corrected by mechanical means advancing or retarding the transducer means relative to the moving record medium.

The invention is useful in both recording and/or playback applications. For example, the embodiment shown in FIG. 4 and described above relative to a playback situation can, with relative ease, be adapted for initially recording information along the record track 44 in a manner to compensate for momentary speed perturbations in the moving record medium or other irregularities as might occur in the provision of a regularly occurring clock track 41.

Thus, for example, clock track 41 can be transduced by means of the transducer head 43 located in a predetermined position and these signals can be fed and amplified directly to phase detector circuit 31 in known style. Phase detector 31 will be, at that time, receiving a train of pulses at a constant repetition rate from oscillator 32 so as to provide an error signal which can be amplified and applied to the bi-morph support assembly 47 so as to advance or retard the positioning of transducer head 46 during the recording phase of the operation. In this way, records can be produced which have minimum time base error inherently in the initially recorded signals thereon whereby, upon being played back on a playback machine, the problem of time base error is maintained minimized.

We claim:

1. In a magnetic recording or playback system for transducing signals relative to a magnetic record medium having discrete signals thereon at substantially regular predetermined intervals and information signals all to be transduced as said medium moves in a predetermined direction, magnetic transducer means disposed to cooperate with said medium to sense said signals to provide a first train of electric signals, means for generating a second train of signals at a desired repetition rate, comparing means coupled to receive both said first and second trains of signals and serving to provide an output control signal representative of the phase difference between the two trains, means supporting said transducer means and responsive to said control signal for adjusting the phase of said first train of signals by advancing or retarding the position of said transducer means along the direction of movement of the medium, and means for adjusting the phase of said second trains of signals in response to prolonged phase differences between said first train of signals and said second train.

2. In a magnetic recording or playback system for transducing signals relative to a magnetic record medium having discrete signals thereon at substantially regular predetermined intervals and information signals all to be transduced as said medium moves in a predetermined direction, said information and regular signals being contained in the same record track along said medium, said information signals constituting video signals and said regular signals constituting a synchronizing pulse for the video signals, magnetic transducer means disposed to cooperate with said medium to sense said signals to provide a first train of electric signals, means for generating a second train of signals at a desired repetition rate, comparing means coupled to receive both said first and said second trains of signals and serving to provide an output control signal representative of the phase difference between the two trains, and means supporting said transducer means and responsive to said control signal for adjusting the phase of said first train of signals by advancing or retarding the position of said transducer means along the direction of movement of the medium.

3. In a system for transducing information and timing signals relative to a record medium moving in a predetermined direction, said timing and information signals being disposed along separate record tracks of said medium, transducer means disposed to cooperate with said medium to sense said timing signals to provide electric signal representations thereof and to transduce said information signals along an information track, means for receiving said signal representations and for providing control signals representative of phase differences between the timing signals and a substantially constant reference, means supporting said transducer means and coupled to respond to said control signals to advance or retard the position of said transducer means along said information track in proportionate relation to said control signals so as to compensate for changes in the phase of the timing signals and said information signals relative to said reference.

4. In a system for transducing information and timing signals relative to a record medium moving in a predetermined direction, said timing and information signals being disposed along the same record track of said medium, transducer means disposed to cooperate with said medium to sense said timing signals and provide electric signal representations thereof and to transduce said information signals along an information track, means for receiving said signal representations and for providing control signals representative of phase differences between the timing signals and a substantially constant reference, means supporting said transducer means and coupled to respond to said control signals to advance or retard the position of said transducer means along said information track in proportionate relation to said control signals so as to compensate for changes in the phase of the timing signals and said information signals relative to said reference.

5. In a system for transducing information and timing signals relative to a record medium moving in a predetermined direction, transducer means disposed to cooperate with said medium to sense said timing signals and provide electric signal representations thereof and to transduce said information signals along an information track, means for receiving said signal representations and for providing control signals representative of phase differences between the timing signals and a substantially constant reference, means supporting said transducer means and coupled to respond to said control signals to advance or retard the position of said transducer means along said information track in proportionate relation to said control signals so as to compensate for changes in the phase of the timing signals and said information signals relative to said reference, said supporting means comprising an elongate bimorph support member characterized by ability to bend in one direction in response to a positive polarity signal applied to the surfaces thereof and in a reverse direction to a negative polarity signal applied to the surfaces thereof.

6. In the transducing of record signals relative to a moving record medium using a transducer head the method of adjusting the rate of transducing said signals relative to said medium to correspond substantially to a predetermined signal repetition rate comprising the steps of transducing a first train of substantially regularly occurring record signals relative to the moving record medium, generating a second train of electric signals at the desired repetition rate, forming a control signal proportionate to momentary differences between said repetition rates, mechanically advancing or retarding said transducer head in the direction of movement of said medium under control of and in response to said control signal, and adjusting the phase or timing of said second train in response to prolonged changes in the phase or timing of said first train.

7. For use in a system for transducing information and timing signals relative to a record medium moving in a predetermined direction, transducer means adapted to be disposed in cooperation with said medium to sense said timing signals and provide electric signal representations thereof, said transducer means comprising a signal transducer and an elongate bimorph support member, said transducer being carried at the distal end of said member, said member being characterized by ability to bend in one direction in response to a positive polarity signal applied to the surfaces thereof and in a reverse direction to a negative polarity signal applied to the surfaces thereof.

* * * * *